United States Patent [19]
Amen

[11] 3,768,003
[45] Oct. 23, 1973

[54] PULSED RESONANCE SPECTROMETER SYSTEM EMPLOYING IMPROVED RADIO FREQUENCY PULSE TURN-OFF METHOD AND APPARATUS

[75] Inventor: Richard E. Amen, Menlo Park, Calif.

[73] Assignee: Varian Associates, Palo Alto, Calif.

[22] Filed: Sept. 27, 1971

[21] Appl. No.: 184,146

[52] U.S. Cl. .............................. 324/0.5 R
[51] Int. Cl. .......................... G01n 27/78
[58] Field of Search ............. 324/0.5 R, 0.5 A, 324/0.5 AC

[56] References Cited
UNITED STATES PATENTS
2,968,762  1/1961  Schuster ........................ 324/0.5

Primary Examiner—Michael J. Lynch
Attorney—Stanley Z. Cole et al.

[57] ABSTRACT

A magnetic resonance spectrometer system wherein a pulse of driving radio frequency signal is transmitted to the resonant circuit coupled to the sample under analysis to produce magnetic resonance therein, the free induction decay signal from said sample being induced in said resonant circuit and delivered to the receiver circuitry after said pulse termination, the ringing signal induced in the receiver circuitry due to energy decay in the resonant circuit after the radio frequency pulse termination being substantially reduced by reversing the phase of the radio frequency transmitter signal just prior to said pulse termination, and then terminating the pulse when the radio frequency transmitter voltage at said resonant circuit is at the zero crossing value.

13 Claims, 5 Drawing Figures

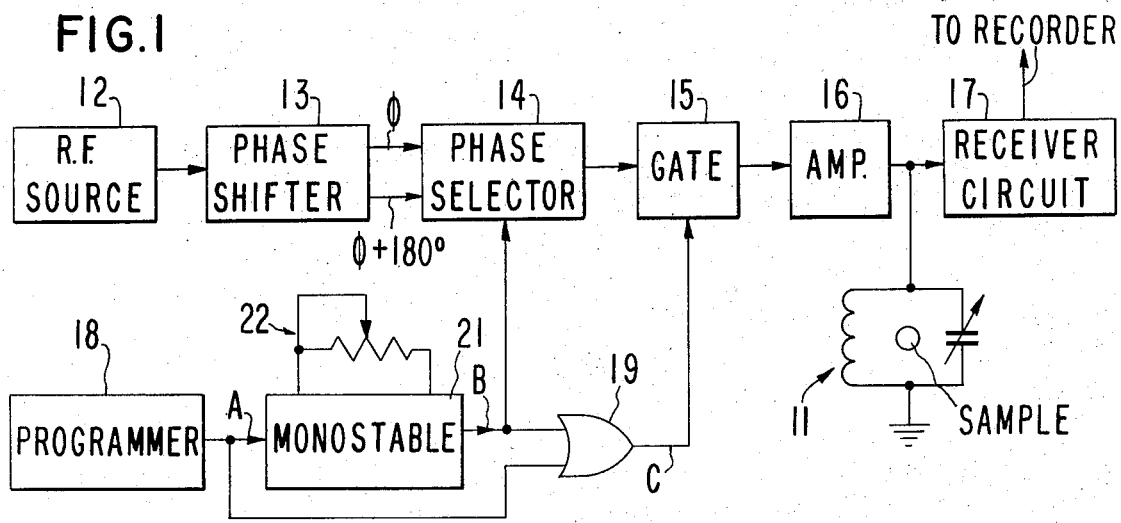
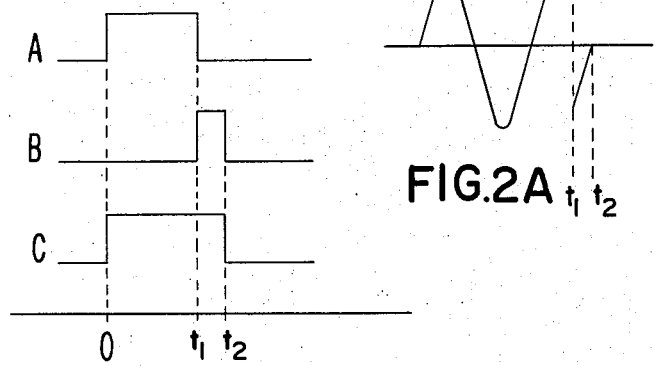
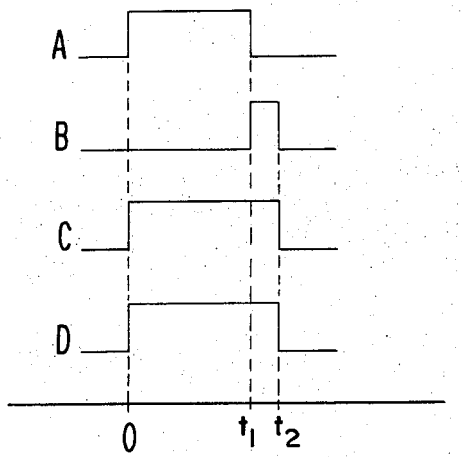
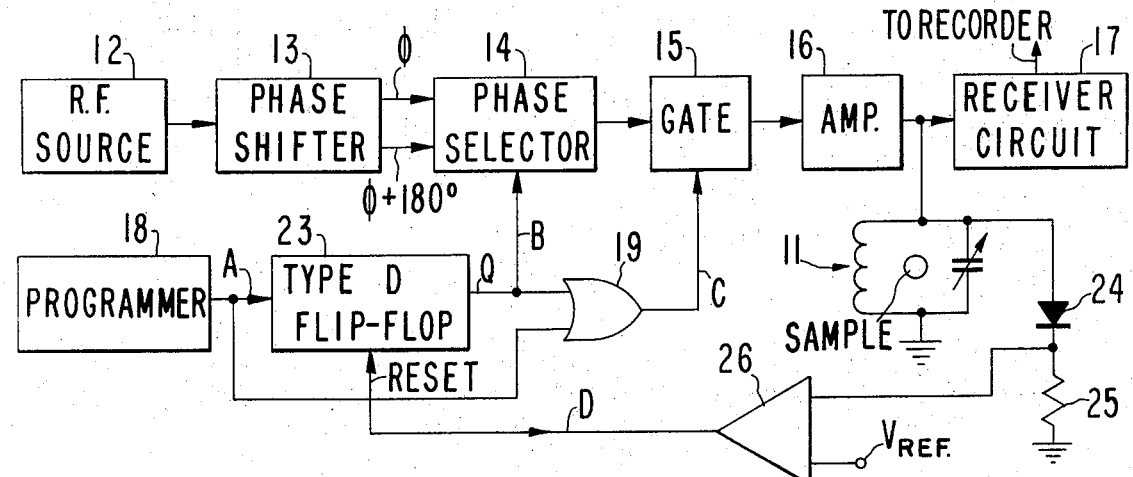

PULSED RESONANCE SPECTROMETER SYSTEM EMPLOYING IMPROVED RADIO FREQUENCY PULSE TURN-OFF METHOD AND APPARATUS

BACKGROUND OF THE INVENTION

Certain forms of spectroscopy employing the application of a driving radio frequency field to a sample under analysis such as nuclear magnetic resonance spectrometers including quadrapole resonance spectrometers and NMR Fourier transform spectrometers, as well as electron paramagnetic resonance spectrometers, employ pulse techniques for producing the desired resonance condition. For example, in a pulsed NMR spectrometer, the driving radio frequency magnetic field is applied to the sample in the polarizing magnetic field in short intense pulses and the magnetic resonance output signals are detected as free induction decay signals induced from the sample after removal of the driving RF pulse. Typical forms of such pulsed magnetic resonance systems are shown and described in articles entitled "Free Nuclear Induction" by E. L. Hahn, Physics Today, Vol. 6, page 4, 1953; "Pulsed Nuclear Resonance Apparatus" by W. Gilbert Clark, The Review of Scientific Instruments, Vol. 35, page 316, March, 1964; and "Application of Fourier Transform Spectroscopy to Magnetic Resonance" by R. R. Ernst et al., The Review of Scientific Instruments, Vol. 37, page 93, January, 1966.

In all of these systems, it is desired that the free induction signal be detected and measured as soon after the termination of the driving radio frequency pulse as possible. The ideal condition is one wherein the receiver is made sensitive to the free induction signal immediately upon termination of the driving pulse, but in practice this cannot be achieved for reasons set forth in detail in the Clark article cited above. Generally speaking, it is not possible to isolate or decouple the receiver circuitry from the transmitter circuitry such that signals resulting from the voltage decay in the transmitter circuitry after pulse turn-off will not result in voltages being induced in the receiver circuitry serving to mask the free induction signals induced therein from the sample.

Several approaches have been taken to reduce the inductive coupling between the transmitter circuitry and the receiver circuitry including the use of crossed-coils, RF balanced bridge circuits, and single coil variable Q circuits. In the crossed-coil approach, two separate high Q resonant coil circuits are utilized, one for the transmitter circuit for applying the driving radio frequency magnetic field to the sample and the other for the receiver circuit for detecting the magnetic field produced by the precessing magnetic moments of the sample. The two coils are mounted with their axes orthogonal to minimize the inductive coupling between the coils and thus substantially eliminate voltages induced in the receiver circuit directly from the transmitter circuit. The receiver coil is mounted around the sample and within the transmitter coil. With this arrangement, although the undesired ringing signal is substantially eliminated from the receiver, optimum coupling between the transmitter coil and the sample is not possible because of the geometry of the probe structure, and this arrangement requires increased power to produce the necessary driving radio frequency magnetic field $H_1$.

A second approach, the RF bridge circuit, utilizes a single coil surrounding the sample and serving as both the transmitter and receiver coil, with a second dummy coil coupled thereto in a bridge configuration, the sample being omitted from the dummy coil. With a proper adjustment of the bridge circuit and with the receiver circuit connected to the bridge to register the voltage differential between the two coil circuits, the RF pulse is nulled at the input to the receiver during the time the transmitter pulse is applied to the two coils. However, the free induction decay signal in the sample coil appears as a difference signal between the two coils and is thus detected by the receiver circuit. This bridge circuit has the advantage that only one dual purpose coil surrounds the sample but it requires delicate bridge balancing and a substantial increase in the power required to produce the $H_1$ field. In addition, the dummy coil reduces the signal-to-noise ratio by loading the sample coil. Thus the delay time to detect the decay signal is reduced at the expense of transmitter power and decreased signal-to-noise.

In the third approach which utilizes a single coil for the transmitter-receiver circuit, close physical coupling to the sample is achieved and the physical geometry of the probe is simplified. However, to reduce the ringing time at the termination of the driving pulse, compromises must be made in the electrical characteristics of the circuit. For example, protective circuits such as parallel crossed silicon diodes are utilized at the receiver input to protect the receiver from the high transmitter voltages. The decay or ringing time is shortened by reducing the Q of the resonant coil circuit, although this Q reduction conflicts with the requirements of a large driving radio frequency magnetic field $H_1$ during the transmitter pulse and/or a high signal-to-noise ratio for the receiver coil circuit. These problems may be partially met utilizing special circuit arrangements operative to reduce the Q of the resonant circuit near the termination of the transmitter pulse and shortly thereafter to thus speed up the decay time of the ringing signal, the special circuit thereafter operating to increase the Q of the resonant circuit and thus render the circuit more sensitive to the free induction signal. Such circuit arrangements become rather complex, especially when the system is required to operate over a substantial frequency band and with diverse samples. An example of this latter form of single coil circuit arrangement is disclosed in an article entitled "A Simple Single-Coil Probe For Pulsed Nuclear Magnetic Resonance" by R. A. McKay, et al., Journal of Scientific Instruments, 1966, Vol. 43, pages 838–840.

BRIEF SUMMARY OF THE PRESENT INVENTION

In the present invention, an improved form of transmitter and resonant circuit is provided for use in pulsed resonance spectrometers including nuclear magnetic, nuclear quadrapole, and electron paramagnetic resonance spectrometer systems wherein the ringing signals due to the energy decay in the resonant circuit at termination of the radio frequency driving pulse are substantially reduced such that the receiver circuitry may respond to the free induction decay signal from the sample material quickly after the termination of the transmitter pulse.

In this improved method and apparatus, the phase of the driving radio frequency voltage wave of the transmitter pulse is reversed just prior to the termination of the RF transmitter pulse and thereafter, when the phase of the driving radio frequency voltage delivered to the resonant circuit is near or passes through the zero crossing, the radio frequency driving pulse is terminated. During the time interval between the phase reversal and the transmitter pulse turn-off, the energy stored in the resonant circuit flows back into the transmitter circuit and thus the ringing in the receiver after transmitter pulse termination due to the energy storage in the high Q resonant circuit is appreciably reduced. The receiver may then detect the free induction decay signal from the sample in the resonant circuit very shortly after termination of the RF transmitter pulse; for example, in a typical NMR system a reduction of the ringing time from 10 microseconds to 3 microseconds has been obtained. The delay time between the phase reversal of the voltage of the transmitter pulse and the RF pulse turn-off is adjustable either manually or automatically to accommodate a wide range of operating radio frequencies and samples.

DESCRIPTION OF THE DRAWINGS

FIG. 1 is a block diagram of a pulsed magnetic resonance system utilizing the phase reversal technique of the present invention.

FIG. 2 is a diagram showing the timing of the control pulses utilized in FIG. 1.

FIG. 2A is a trace of the RF transmitter voltage across the resonant circuit at the time of phase reversal.

FIG. 3 is a block diagram of a second embodiment of the present invention.

FIG. 4 is a diagram showing the timing of the pulses utilized in the system of FIG. 3.

DESCRIPTION OF THE PREFERRED EMBODIMENTS

Referring now to FIG. 1, there is shown the resonant circuit 11 representing the single coil resonant circuit coupled to the sample under analysis in a nuclear magnetic resonance spectrometer system or the microwave resonator, e.g. cavity or helix or the like, enclosing the sample under analysis in an electron paramagnetic resonance spectrometer. For reasons described above, it is most desirable that the resonant circuit 11 maintain a high Q value during both the transmitter pulse stage and the free induction decay signal pick-up stage. The radio frequency driving signal is obtained from a suitable RF source 12 which is coupled to a phase shifter circuit 13 producing two separate radio frequency outputs separated in phase by 180°. One or the other of these two phase outputs may be selected by the phase selector circuit 14 and transmitted through an RF gate circuit 15 and the amplifier 16 to the resonant circuit 11. This radio frequency signal produces a driving radio frequency magnetic field $H_1$ at the sample in the resonant circuit to produce magnetic resonance of the sample. The receiver circuit 17, which is designed to detect and record the relatively weak free induction decay signal from the sample after termination of the transmitted radio frequency signal, contains suitable protection circuitry to withstand the high intensity transmitter pulse from the transmitter stage. The length of the pulse of driving radio frequency voltage, e.g. 1 to 10 μsec spaced apart 10 μsec to 100 millisecs, is determined by a suitable programmer 18 which supplies the gating pulse A (FIG. 2) to the OR gate 19 which operates to open the gate 15 to permit the radio frequency signal to flow to the amplifier 16. The output of OR gate 19 is represented by trace C of FIG. 2. When the gating pulse A from the programmer 18 terminates at time $t_1$, the monostable circuit 21 is operated to transmit a pulse B of FIG. 2 to the phase selector circuit 14 and to the other input of the OR gate 19. The phase selector circuit 14 operates to switch the input to gate 15 from one phase, for example $\phi$, to the other phase, for example $\phi \pm 180°$. The phase of the RF drive to the resonant circuit 11 is thus reversed (FIG. 2A) and the energy stored in the resonant circuit 11 flows back into the amplifier circuitry 16. The on time of the monostable circuit 21 is controlled by the variable control circuit 22 so that the output pulse terminates at approximately the time $t_2$ when the voltage across the resonant circuit 11 is at the zero crossing point. Termination of pulse B operates the OR gate 19 to close the gate 15 and terminate the driving radio frequency signal to the amplifier 16 and resonant circuit 11. Since at this moment of termination a substantial portion of the energy stored in the resonant circuit 11 has been delivered back into the amplifier circuitry 16, the ringing due to the decay of the remaining energy stored in the resonant circuit 11 is very short in time and the receiver circuitry 17 may respond quickly to the radio frequency signal induced in the resonant circuit 11 from the precessions of the magnetic moments in the sample under analysis.

The time interval between $t_1$ and $t_2$ may be easily adjusted by the control circuit 22 and thus the system made to accommodate wide ranges of frequencies from the RF source 12 and samples within the resonant circuit 11.

Referring now to FIG. 3, there is shown a system similar to that of FIG. 1 which includes a circuit for measuring the voltage across the resonant circuit 11 to operate and automatically terminate the radio frequency transmitter pulse at or near the zero crossing of the voltage. In this particular circuit a flip-flop 23 is provided to control the phase selector circuit 14 and the OR gate 19. A voltage measuring circuit comprising diode 24 and resistor 25 is coupled to the resonator circuit 11 to measure the voltage thereacross such that when the voltage drops to a value below that of the reference voltage at the comparator circuit 26, the comparator circuit operates to reset the flip-flop to thereby open the RF gate 15 and terminate the transmitter pulse. The reference voltage to the comparator may be adjusted such that the RF gate turn-off sequence is initiated sufficiently ahead of the zero voltage cross-over point to allow for logic propagation delay times.

Other forms of circuitry for sensing the zero crossing may be employed, including a circuit for developing an error signal with a sign and magnitude dependent on the deviation in time from the optimum gate turn-off time, the error signal serving to control the turn-off time, e.g., controlling circuit 22 in FIG. 1.

Although this invention was described with reference to its application to a magnetic resonance form of spectrometer, it should be understood that it will apply to other forms of spectroscopy which may make use of pulse techniques, such as microwave absorption spectroscopy. Also, while otpimum results are obtained with a 180° phase reversal, good results may be obtained with a phase reversal near 180°, since any phase reversal greater than ± 90° will produce some degree of energy dumping.

What is claimed is:

1. A resonance spectrometer system comprising a high Q resonant circuit for applying a radio frequency magnetic field to a sample material coupled to said resonant circuit to produce resonance therein, pulse transmitter means coupled to said resonant circuit for providing a radio frequency signal to said resonant circuit to produce said radio frequency magnetic field, receiver means coupled to said resonant circuit for detecting the free induction decay signal induced in said resonant circuit from said sample after termination of said transmitter pulse, said receiver means being coupled to said resonant circuit during both the application of said radio frequency magnetic field to said sample and the detection of said free induction decay signal, means coupled to said transmitter means for changing the phase of said radio frequency signal to said resonant circuit, and means for terminating said radio frequency transmitter signal after said phase change and at that point in time after said phase reversal when the voltage across said high Q resonant circuit is near its zero crossing, to thereby substantially reduce ringing signals in said receiver means due to energy storage in said high Q resonant circuit after transmitter pulse termination.

2. A resonance spectrometer system as claimed in claim 1 wherein said resonance is the magnetic resonance of the sample.

3. A resonance spectrometer system as claimed in claim 2 wherein said resonant circuit comprises a radio frequency coil and said resonance is the magnetic resonance of nuclei in the sample.

4. A resonance spectrometer system as claimed in claim 2 wherein said resonant circuit comprises a microwave resonator and said resonance is electron paramagnetic resonance.

5. A resonance spectrometer system as claimed in claim 1 wherein said means for changing the phase of the radio frequency signal reverses the phase substantially 180° and said means for terminating said signal operates to terminate the signal in the region of the next zero crossing of the radio frequency voltage across said resonant circuit.

6. A resonance spectrometer system as claimed in claim 5 wherein said means for terminating said radio frequency transmitter signal comprises a timer circuit operative a selected time after said phase reversal.

7. A resonance spectrometer system as claimed in claim 5 wherein said means for terminating said radio frequency transmitter signal comprises means for measuring the voltage of said radio frequency across said resonant circuit after said phase reversal.

8. A resonance spectrometer system as claimed in claim 7 wherein said last means comprises a means for sensing the radio frequency voltage across said resonant circuit, and means for comparing said sensed voltage with a reference voltage.

9. A resonance spectrometer system as claimed in claim 1 wherein said transmitter means includes a radio frequency source and a phase shifter circuit coupled to said source for providing a first radio frequency signal and a second radio frequency signal shifted 180° from said first signal, said means for changing said phase of said radio frequency signal comprising means for selecting between said first and second radio frequency signals.

10. A magnetic resonance spectrometer system comprising a high Q resonant circuit for applying a radio frequency magnetic field to a sample material coupled to said resonant circuit to produce magnetic resonance therein, pulse transmitter means coupled to said resonant circuit for providing a radio frequency voltage to said resonant circuit to produce said radio frequency magnetic field, receiver means coupled to said resonant circuit for detecting the free induction decay signal induced in said resonant circuit from said sample after termination of said transmitter pulse, said receiver means being coupled to said resonant circuit during both the application of said radio frequency magnetic field to said sample and the detection of said free induction decay signal, means coupled to said transmitter means for reversing the phase of said radio frequency voltage to said resonant circuit substantially 180°, and means for terminating the pulse of radio frequency voltage to said resonant circuit when the radio frequency voltage across said resonant circuit is at the zero crossing region after said phase reversal to thereby substantially reduce ringing signals in said receiver means due to energy storage in said high Q resonant circuit after transmitter pulse termination.

11. The method of measuring free induction decay signals from a sample in a high Q resonant circuit, said resonance circuit being coupled to both the transmitter means and receiver means in a magnetic resonance spectrometer apparatus comprising the steps of applying a pulse of radio frequency energy to said resonant circuit from said transmitter means to produce magnetic resonance in said sample, changing the phase of said applied radio frequency energy, terminating said radio frequency pulse to said resonant circuit immediately after said phase reversal and at a time when the voltage of the applied radio frequency across said resonant circuit is near the zero crossing after said phase reversal, to thereby substantially reduce ringing signals in said receiver means due to energy storage in said high Q resonant circuit after transmitter pulse termination, and detecting in said receiver means the free induction decay signal in said resonant circuit from said sample after said radio frequency pulse termination.

12. The method as claimed in claim 11 wherein said step of terminating said radio frequency pulse comprises the step of measuring a preselected time interval after said phase change.

13. The method as claimed in claim 11 wherein said step of terminating said radio frequency pulse comprises the step of measuring the voltage across said resonant circuit to determine the zero cross-over time.

* * * * *